(12) United States Patent
Binjrajka (10) Patent No.: US 9,557,988 B2
(45) Date of Patent: Jan. 31, 2017

(54) WORKFLOW-BASED APPLICATION GENERATOR

(71) Applicant: INADEV CORPORATION, McLean, VA (US)

(72) Inventor: Vikrant Binjrajka, North Potomac, MD (US)

(73) Assignee: INADEV CORPORATION, McLean, VA (US)

( * ) Notice: Subject to any disclaimer, the term of this patent is extended or adjusted under 35 U.S.C. 154(b) by 231 days.

(21) Appl. No.: 13/840,158

(22) Filed: Mar. 15, 2013

(65) Prior Publication Data

US 2014/0075413 A1 Mar. 13, 2014

Related U.S. Application Data

(60) Provisional application No. 61/698,179, filed on Sep. 7, 2012.

(51) Int. Cl.
*G06F 9/44* (2006.01)
*G06Q 10/06* (2012.01)
*G06Q 10/10* (2012.01)

(52) U.S. Cl.
CPC . *G06F 8/71* (2013.01); *G06F 8/30* (2013.01); *G06Q 10/0633* (2013.01); *G06Q 10/103* (2013.01)

(58) Field of Classification Search
USPC .......................................................... 717/121
See application file for complete search history.

(56) References Cited

U.S. PATENT DOCUMENTS

| | | | |
|---|---|---|---|
| 7,194,473 B1* | 3/2007 | Hichwa et al. | |
| 2006/0253830 A1* | 11/2006 | Rajanala | G06F 8/36 717/105 |
| 2007/0157191 A1* | 7/2007 | Seeger et al. | 717/168 |
| 2008/0077920 A1* | 3/2008 | Faatz et al. | 718/100 |
| 2010/0125826 A1* | 5/2010 | Rice | G06F 17/30867 717/107 |

\* cited by examiner

*Primary Examiner* — Hang Pan
(74) *Attorney, Agent, or Firm* — Mannava & Kang, P.C.

(57) ABSTRACT

A workflow-based application generator to generate a workflow application based upon at least one received workflow process. The application generator is to generate, based on the received workflow process, workflow configuration rules that include a list of determined workflow pages based on a required functionality, and configuration routing rules that include an order of the workflow pages and dependency information pertaining to the workflow pages. The workflow-based application generator is to generate a workflow context according to the workflow configuration rules, the configuration routing rules, and the retrieved workflow pages. Based upon the generated workflow context, the workflow-based application generator is to build a workflow application.

17 Claims, 6 Drawing Sheets

WORKFLOW-BASED APPLICATION GENERATOR

CLAIM FOR PRIORITY

The present application claims priority to U.S. Provisional application No. 61/698,179, filed on Sep. 7, 2012, which is incorporated by reference herein in its entirety

BACKGROUND

Computer based workflow applications automate aspects of processes such as business and manufacturing processes.

A workflow process typically consists of a workflow that includes a number of tasks or activities, and a number of interrelationships between the activities determining the order of execution of the activities. A workflow targeted for different computing platforms can result in multiple workflow processes for the multiple and different computing platforms.

BRIEF DESCRIPTION OF DRAWINGS

The embodiments are described in detail in the following description with reference to the following figures. The figures illustrate examples of the embodiments.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Furthermore, the embodiments may be used together in various combinations.

Figure 1:
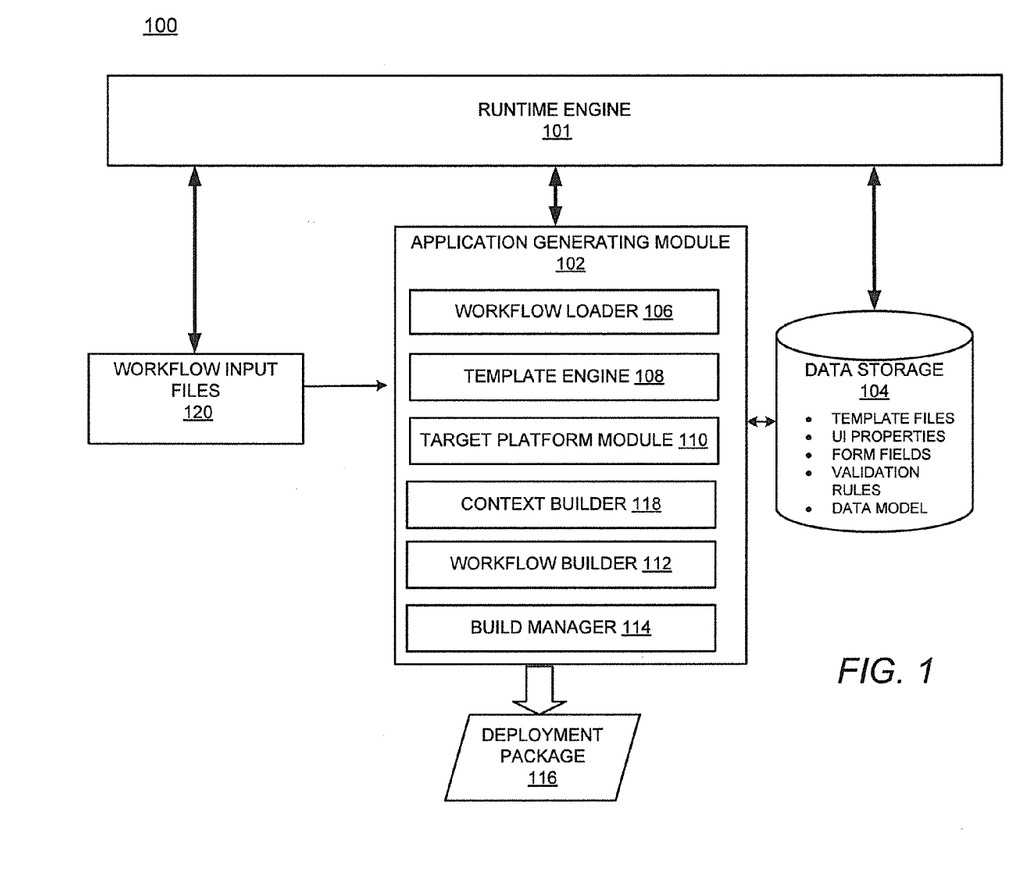
FIG. 1 illustrates a workflow-based application generator accordingly to one embodiment.

According to an embodiment, FIG. 1 depicts a workflow-based application generator 100 (hereinafter "application generator 100") that uses predefined workflow rules and user interface (UI) templates that support auto generation of computer files for use on different platforms, including mobile and web platforms. Because of the similarity of steps in different workflows, the predefined workflow rules and UI templates of application generator 100 allows for the reuse of previously coded steps and thus avoids the recoding of steps common, or similar, to different workflows. Still further, because of the similarities between steps of a same workflow targeted to different platforms, a non-platform specific reusable workflow component (hereinafter "workflow page") may be created and include metadata to define data in, data out, and rules that the workflow page complies with. Accordingly, as used in this specification, a workflow page is a reusable component that may be combined with other workflow pages to automatically generate different applications. Thus, application generator 100 reuses defined workflow pages, customized by metadata, so as to avoid recoding of steps, even where the steps are not exactly the same but can be customized to the workflow by defining sets of contextual rules.

The application generator 100 includes an application generating module 102 that includes a workflow loader 106 to receive workflow input files 120 that include industry standard business process and workflow definition files. The workflow loader 106 converts the workflow input files 120 to system specific configuration files. In addition, the workflow loader permits a user (e.g., a programmer) to manually create and/or edit the workflow definitions as needed, using user interface 334.

In one embodiment, application generator module 102 further includes: a template engine 108 to define and process template based UI components; a context builder 118 to assemble the outputs of the workflow loader 106 and template engine 108, and generate a workflow context; a target platform module 110 with platform specific extensions to support auto generation of workflow pages for various mobile and web platforms; and a workflow builder 112 to receive the workflow context from the context builder and the output of the target platform module 110. The workflow builder 112 generates a workflow application output that is received by build manager 114. The build manager 114 automates the packaging of the output of the workflow builder 112 and generates deployment package 116, which includes files pertaining to workflows pages for selected user platforms.

Application generator 100 further includes a core runtime engine 101 to execute and orchestrate the automation of workflow page generation, and data storage 104. The data storage 104 may include memory for performing in-memory processing and/or non-volatile storage, such as hard disks that serve as a repository for various data files including template files, user interface (UI) properties, form files, validation rules, and the application data model.

Application generator 100 may be broken down into three functional blocks illustrated in FIG. 2 and listed below:
1) Pre-processing and preparation of workflow context (202)
2) Processing of workflow context (204); and
3) Building and packaging system output (206)

Figure 3:
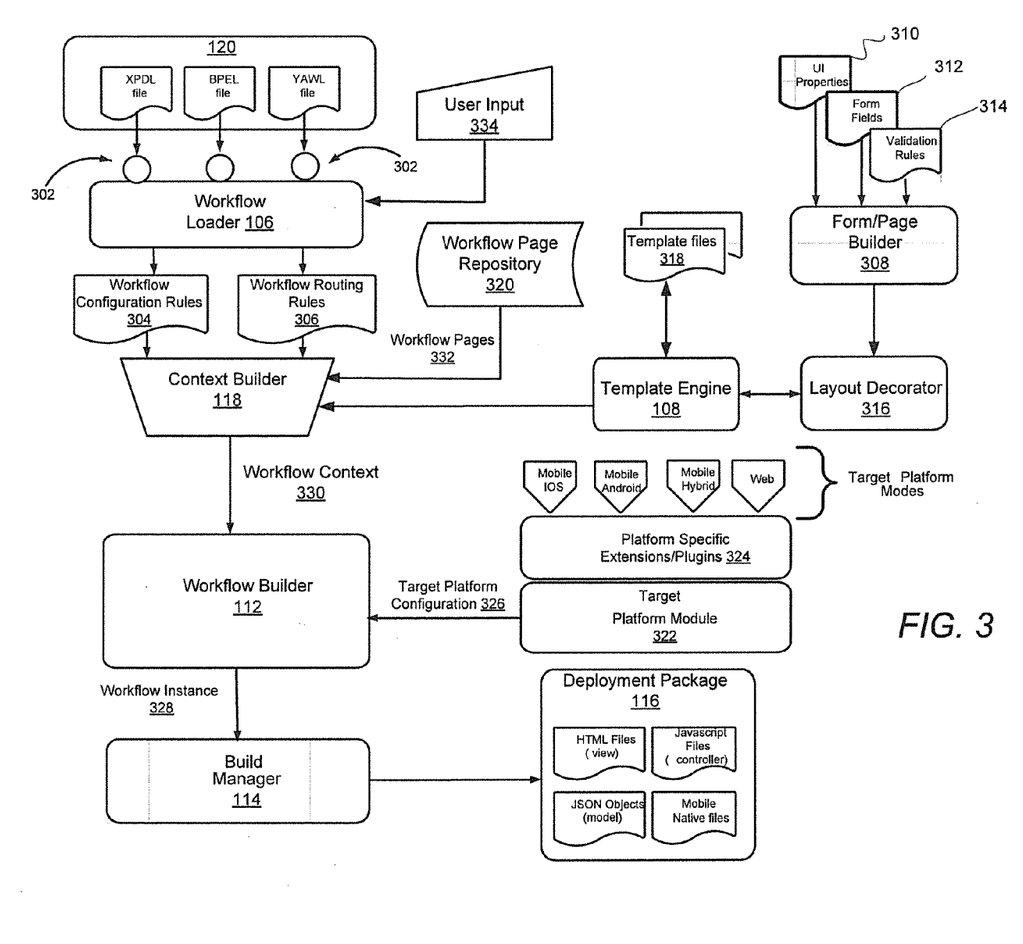
FIG. 3 illustrates a detailed block diagram of the workflow-based application generator of FIG. 1.
Figure 4:
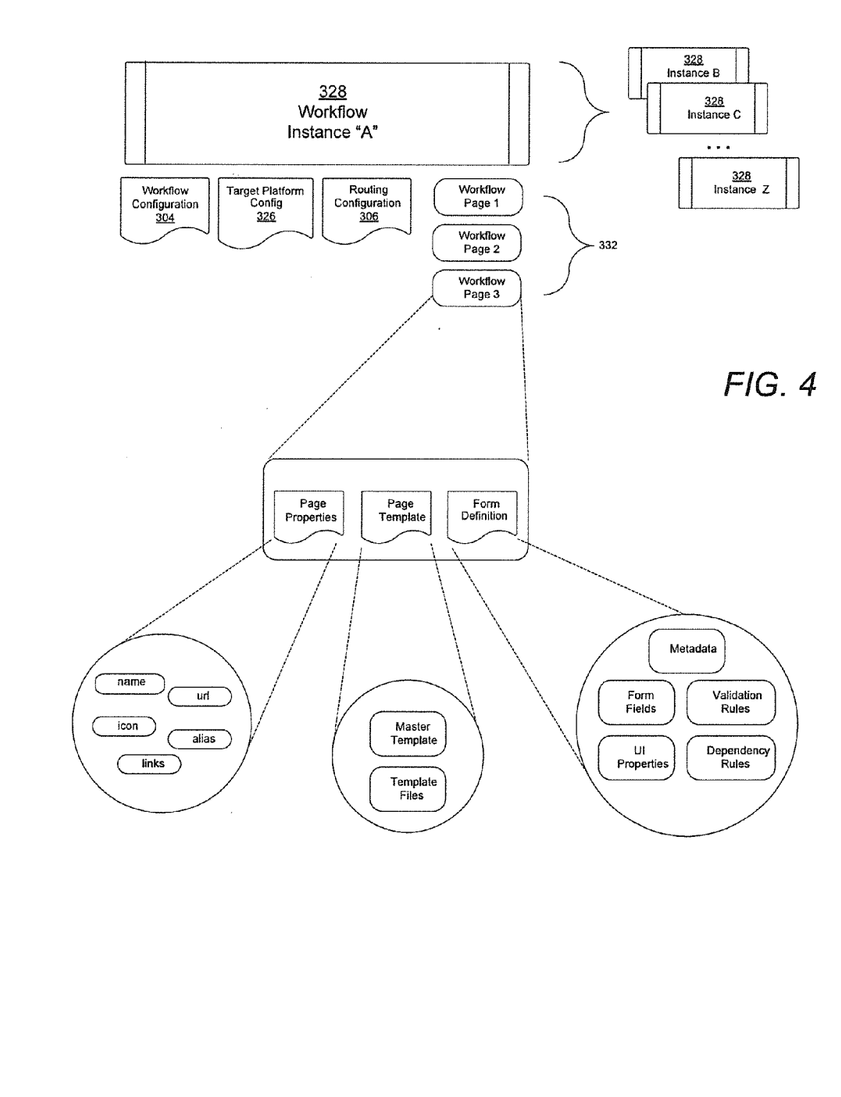
FIG. 4 illustrates an embodiment of a workflow generated according to one embodiment of the workflow-based application generator of FIG. 1.
Figure 5:
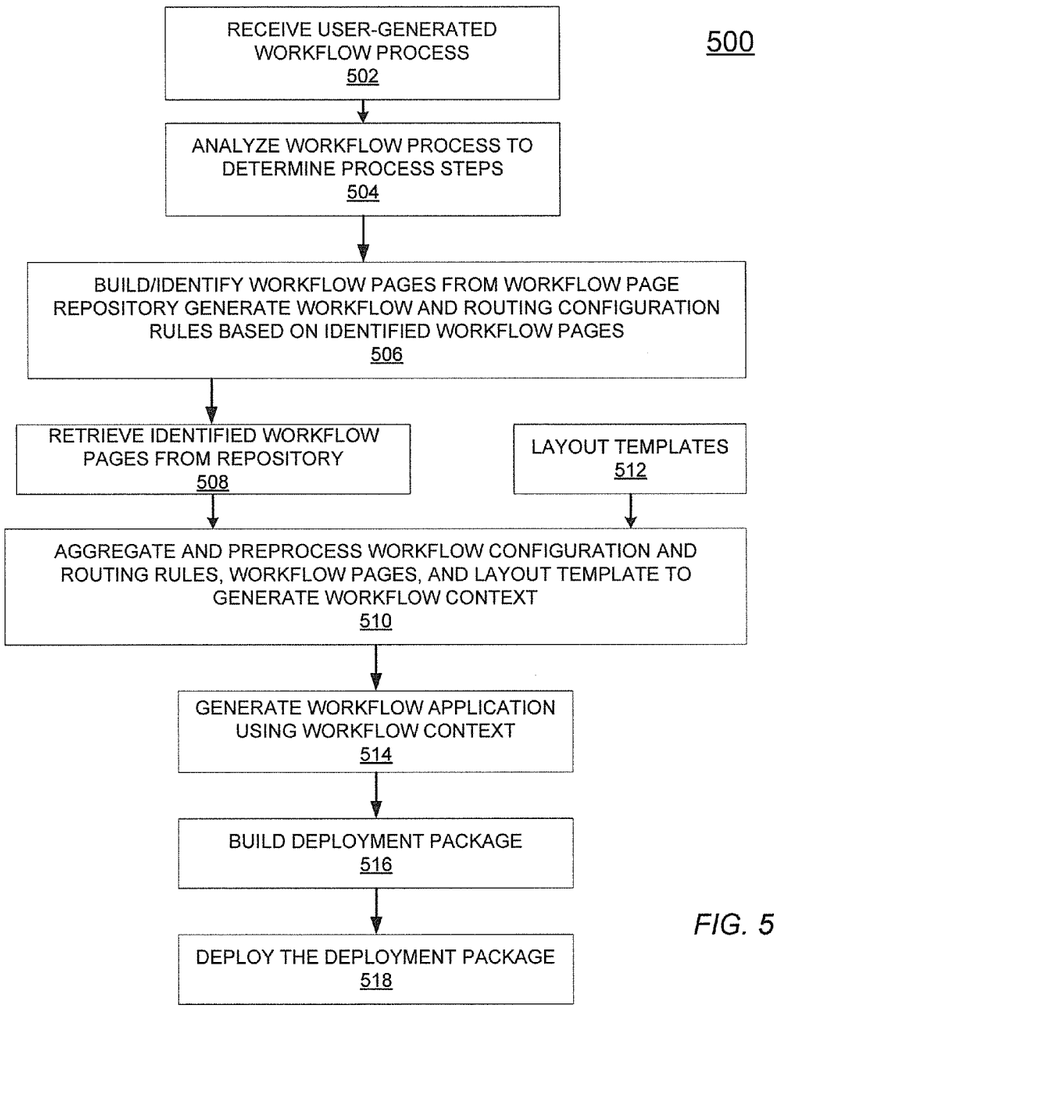
FIG. 5 illustrates a method of implementing the workflow-based application generator of FIG. 1.

The three functional blocks performed by application generator 100 are described using FIGS. 3-5.

Pre-processing and preparation of workflow context 202 is performed by workflow loader 106 and template engine 108. Workflow loader 106 is configured to accept, as an input from a user, a workflow that may be defined using one or more different types of industry standard workflow and business process definition files 120, or be manually specified by a user via user interface 334. These industry standard formats include, but are not limited to Business Process Execution Language (BPEL) files, Java-based BPM/Workflow Management System (YAWL) files, and XML Process Definition Language (XPDL) files. The workflow loader 106 converts input files 120 into workflow configuration rules 304 and routing configuration rules 306 specific to the defined workflow. For example, the workflow configuration rules 304 include a number of steps in the workflow and workflow pages 332 that define feature functionality. The routing configuration rules 306 include order and dependency information for the various workflow pages 332 and are extensible to include input and output requirements.

In one embodiment, workflow loader 106 employs an extensible design with a file-format specific plug-in architecture 302, that allows the system 100 to integrate new file formats merely by introducing new plug-ins. Plug-in architecture 302 allows a business process modeler to model independent of other modelers using commercial available business modeling tools. In addition, the plug-in architecture makes it possible to use existing business process/workflow definitions for users migrating from another system. Still further, in at least one embodiment, application generator 100 includes user interface 334 for direct defining of configuration rules 304 and routing rules 306, instead of using another file format.

As described above, the generated workflow configuration rules 304 include feature functionality and a list of workflow pages 332 to be selected from workflow page repository 320, or generated, based on the workflow process defined by input files 120. Each workflow page 332 may have associated with it a unique identification (ID) that corresponds to a workflow page component stored in a workflow page repository 320 of data storage 104. In at least one embodiment a workflow page 332 is a reusable software component comprising metadata that may be customized according to a specific process step of a particular workflow process, thus allowing the workflow page 332 to be reused in multiple workflow applications. A user may use user interface 334 to select a workflow page 332 to include in the workflow and an execution order.

The generated routing configuration rules 306 define the workflow specific routing logic for the workflow pages defined in the workflow configuration rules 304. The routing logic determines, based upon a current workflow page 332, the current status of the application, and the actions of the user, and a next workflow page 332 to execute (e.g., execution order of the pages).

The template engine 108 provides the application generator 100 with layout information that is common information for the generated workflow, e.g., a header, a footer, a color scheme for a page, and global application parameters. The layout information is stored in template files 318 in data storage 104. Application generator 100 customizes the workflow pages with the common layout information.

The template engine 108 uses form/page builder 308 to construct dynamic forms and pages based on configured user interface properties 310, form fields 312, and validation rules 314. Template engine 108 uses layout decorator 316 to build and store template files 318 and provide the template files to context builder 118. Furthermore, layout decorator 316 is configured to allow a user to define re-usable template fragments and sections.

At step 204, the context builder 118 aggregates and preprocesses the workflow configuration rules 304, the routing configuration rules 306, the workflow pages 332, and the template files 318. Furthermore, based upon the IDs of the workflow pages identified in rules 304 and 306, context builder retrieves software code relating to the identified workflow pages from a code repository that in one embodiment is part of the workflow page repository 320. Based upon the aggregated inputs, context builder 118 generates workflow context 330 in a format receivable by workflow builder 112.

Once workflow context 330 is constructed, at step 204 workflow builder 112 processing workflow context 330.

Workflow builder 112 analyzes the workflow context 330 and generates workflow instance 328 using target platform configuration data 326 from target platform module 322. Target platform module 322 includes a set of plug-ins and extensions 324 that modifies the behavior of workflow pages 332 based on a desired target platform. Plug-ins and extensions 324 allow a user to use the same set of rules, configurations, and stored code, to build output deployment package 116 for a specific target platform. Plug-ins and extensions 324 support multiple platforms, including but not limited to, mobile IOS, Mobile Android, Mobile Hybrid, and Web based systems. The target platform module 322 and platform specific extensions and plug-ins 324 have extensible architectures. The extensible architectures support native mobile functionality and help to avoid problems that may arouse from differences between different platform types.

Workflow builder 112 and build manager 114 generate deployment package 118 that includes a workflow instance 328 using MVC (model-view-controller) design pattern that separates a representation of information from the user's interaction with it.

As illustrated in FIG. 4, application generator 100 can support multiple workflow instances 328, e.g., A through Z, simultaneously, wherein each generated workflow instance 328 includes workflow configuration rules 304, routing configuration rules 306, and a target platform configuration 326 that includes information that allows rules 304 and 306, and workflow pages 332 to be combined to generate a workflow specific to a particular target platform.

FIG. 4 further depicts workflow instance A as including multiple workflow pages 332, e.g., pages 1-3. The workflow pages 332 are flexible and extensible, each page including page properties, a page template, and form definitions supplied by the workflow configuration rules 304, routing configuration rules 306, and the target platform configuration 326. If multiple workflows are configured, system 100 creates workflow selector logic and includes it in the deployment package 118. For example, based on a user selection of one UI element on one page of one workflow, application generator 100 can route the user to a specific workflow page of another workflow instance.

Deployment package 116 includes HTML files, JavaScript files (which include routing mechanisms and workflow selectors), JSON (JavaScript Object Notation) objects and, depending on a specific configuration, platform specific native files.

Figure 2:
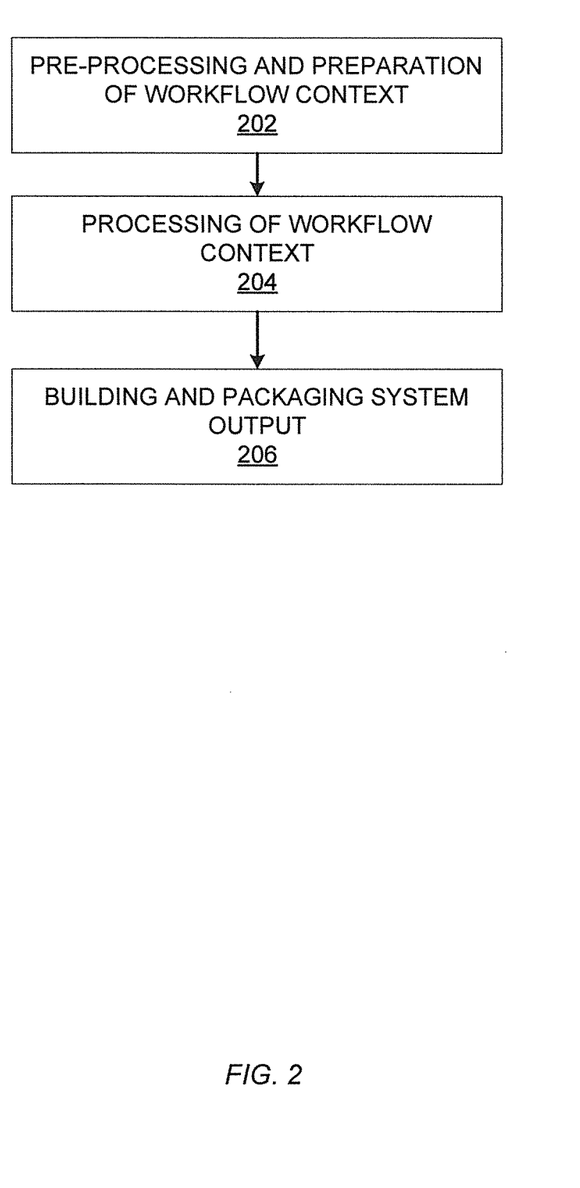
FIG. 2 illustrates high-level functionality according to one embodiment of the workflow-based application generator of FIG. 1.

FIG. 5 illustrates a method, according to an embodiment, to implement the high-level functional flowchart of FIG. 2.

At 502, workflow loader 106 receives a user generated workflow process defined using an industry standard workflow and business process definition file. Additionally or alternatively, the user may directly define the workflow process via user interface 334.

At 504, the application generator 100 analyzes the received workflow process to determine process steps according to the workflow process.

At 506, the application generator 100 builds or identifies any workflow pages stored in repository 320 that are similar to one or more of the determined process steps, each stored workflow page 332 representing a step or multiple steps in a workflow process, and is a reusable software component defined by metadata, e.g., a workflow ID, a description, etc. The application generator 100 generates workflow configuration rules 304 and routing configuration rules 306 that include an ID associated with an identified workflow page.

At 508, the application generator 100 retrieves the identified workflow pages 332 stored in repository 320.

At 510, context builder 118 aggregates and preprocesses the workflow configuration 304, the routing configuration 306, workflow pages 332, the program code associated with the workflow pages 332, and template files 318 previously stored or newly generated at step 512. Based upon the aggregated and preprocessed inputs, context builder 118 generates workflow context 330.

At 514, workflow builder 112 generates workflow instance 328 based on workflow context 330 and a selected target platform configuration 326.

After workflow instance 328 is generated, at 516, workflow builder 112 uses the build manager 114 to build and package deployment package 116. Build manager 114 uses an internal dependency management mechanism and the workflow instance 328 to build deployment package 116, which is ready at 518, to be deployed on the selected target platform.

Figure 6:
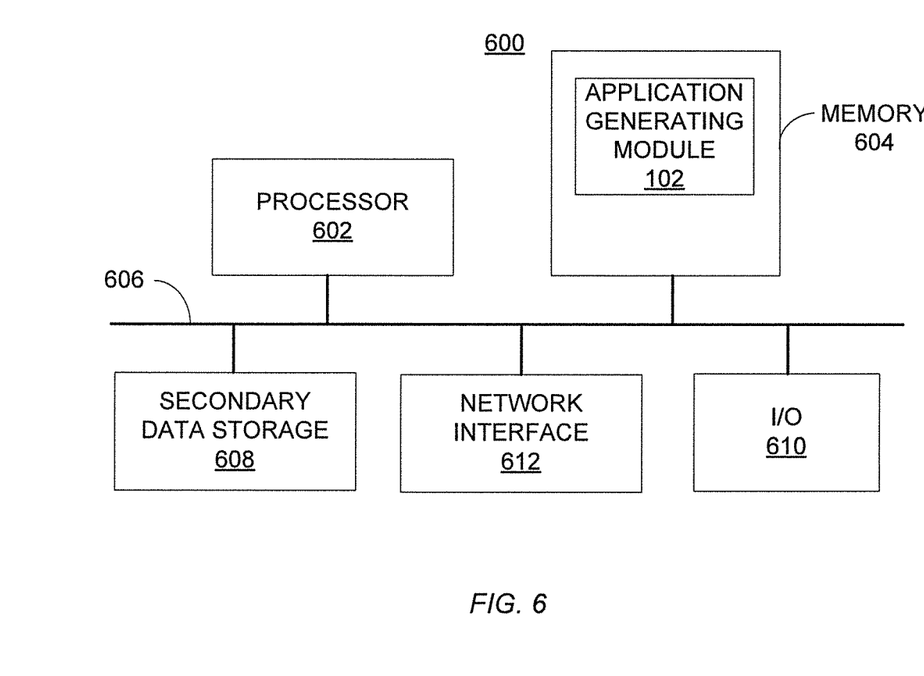
FIG. 6 illustrates a computer system that may be used for the methods and systems described herein.

FIG. 6 shows a computer system 600 that may be used with the embodiments described herein including the application generator 100. The computer system 600 represents a generic platform that includes components that may be in a server or another computer system. The computer system 600 may be used as a platform to run runtime engine 101 for the application generator 100. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes at least one processor 602 that may implement or execute machine readable instructions performing some or all of the methods, functions and other processes described herein. Commands and data from the processor 602 are communicated over a communication bus 604. The computer system 600 also includes a main memory 606, such as a random access memory (RAM), where the machine readable instructions and data for the processor 602 may reside during runtime, and secondary data storage 608, which may be non-volatile and stores machine readable instructions and data used by system 600.

For example, the application generating module 102 may comprise machine readable instructions that reside in the memory 606 during runtime, and secondary data storage 608 may comprise workflow page repository 320, template files 318, UI properties 310, form fields 312, and validation rules 314. Other components of the systems described herein may likewise be embodied as machine readable instructions stored in the memory 606 during runtime. The memory 606 and data storage are examples of non-volatile computer readable mediums.

The computer system 600 may include an I/O device 610, such as a keyboard, a mouse, a display, etc. The computer system 600 may include a network interface 612 for connecting to a network. The application generator 100 may receive workflow input files 120 and output deployment package 116 via a network using network interface 612. Other known electronic components may be added or substituted in the computer system 600. Also, the application generator 100 may be implemented in a distributed computing environment, such as a cloud system.

While the embodiments have been described with reference to examples, various modifications to the described embodiments may be made without departing from the scope of the claimed embodiments.

What is claimed is:

1. A method of generating a workflow-based application, comprising:
   receiving, by a data processing device, workflow input files comprising workflow files and business process definition files;
   create a workflow page repository storing workflow pages and metadata for each workflow page including a workflow page description describing one or more steps performed by each workflow page, wherein each workflow page includes reusable code that performs the one or more steps of the workflow page;
   parsing the workflow input files to determine a plurality of feature functionalities of the workflow-based application being generated, and to determine one or more processing steps for each feature functionality;
   creating workflow configuration rules including the plurality of feature functionalities of the workflow-based application being generated, and including the one or more processing steps for each feature functionality, wherein creating the workflow configuration rules further includes defining and editing, by input received via a user interface, at least one of the workflow configuration rules;
   creating routing configuration rules including an order for executing the feature functionalities and dependencies for the feature functionalities;
   for each feature functionality in the workflow configuration rules, searching the workflow page descriptions in the workflow page repository based on the steps for the feature functionality in the workflow configuration rules;
   identifying matching workflow pages from the searching of the workflow page repository for each feature functionality;
   building workflow pages for any of the feature functionalities that do not have a matching workflow page, and storing the built workflow pages in the workflow page repository;
   including workflow page identifiers for the matching workflow pages and the built workflow pages in the workflow configuration rules;
   including an order of executing the matching and built workflow pages and input and output requirements of each of the matching and built workflow pages in the routing configuration rules;
   generating a workflow context according to the workflow configuration rules, the routing configuration rules, and the matching, built workflow pages,
   wherein generating the workflow context includes:
   retrieving a workflow page template; and
   aggregating the workflow configuration rules, the routing workflow rules, the matching, built workflow pages, and the retrieved workflow page template into the generated workflow context; and
   generating the workflow-based application based upon the workflow context.

2. The method of claim 1, further comprising building the workflow page template using user interface properties, form fields, and validation rules.

3. The method of claim 1, further comprising:
   selecting a target platform configuration;
   generating the workflow-based application using the workflow context and the selected target platform configuration; and
   building a deployment package using the generated workflow-based application.

4. The method of claim 3, wherein selecting the target platform configuration includes:
selecting a target platform mode from a plurality of platform modes, each platform mode having an associated platform specific plugin module; and
generating the target platform configuration based on the associated platform specific plugin module.

5. The method of claim 1, wherein receiving the workflow input files includes receiving a file having a format type that includes Business Process Execution Language (BPEL), Java-based BPM/Workflow Management System (YAWL), and XML Process Definition Language (XPDL).

6. The method of claim 1, further comprising:
storing workflow pages in the workflow page repository, each workflow page representing steps in a workflow and comprises a reusable component defined by metadata.

7. The method of claim 6, wherein each workflow page stored in the workflow page repository includes an ID associated with the workflow page.

8. A workflow-based application generator, comprising:
a data processing device; and
a memory on which is stored machine readable instructions, that when executed by the data processing device cause the data processing device to:
receive workflow input files comprising workflow files and business process definition files;
create a workflow page repository storing workflow pages and metadata for each workflow page including a workflow page description describing one or more steps performed by each workflow page, wherein each workflow page includes reusable code that performs the one or more steps of the workflow page;
parse the workflow input files to determine a plurality of feature functionalities of a workflow-based application being generated, and to determine one or more processing steps for each feature functionality;
create workflow configuration rules including the plurality of feature functionalities of the workflow-based application being generated, and including the one or more processing steps for each feature functionality, wherein creating the workflow configuration rules further includes defining and editing, by input received via a user interface, at least one of the workflow configuration rules;
create routing configuration rules including an order for executing the feature functionalities and dependencies for the feature functionalities;
for each feature functionality in the workflow configuration rules, search the workflow page descriptions in the workflow page repository based on the steps for the feature functionality in the workflow configuration rules;
identify matching workflow pages from the searching of the workflow page repository for each feature functionality;
build workflow pages for any of the feature functionalities that do not have a matching workflow page, and storing the built workflow pages in the workflow page repository;
include workflow page identifiers for the matching workflow pages and the built workflow pages in the workflow configuration rules;
include an order of executing the matching and built workflow pages and input and output requirements of each of the matching and built workflow pages in the routing configuration rules;
generate a workflow context according to the workflow configuration rules, the routing configuration rules, and the matching, built workflow pages,
wherein generating the workflow context includes;
retrieve a workflow page tinplate; and
aggregate the workflow configuration rules, the routing workflow rules, the matching, built workflow pages, and the retrieved workflow page template into the generated workflow context; and
generate the workflow-based application based upon the workflow context.

9. The workflow-based application generator of claim 8, wherein said instructions are further to cause the data processing device to receive a plurality of workflow processes having at least one process step in common, wherein the generated workflow configuration rules and the generated routing configuration rules for each workflow process of the plurality of workflow processes includes a common workflow page.

10. The workflow-based application generator of claim 8, wherein a workflow page in the generated workflow-based application includes:
page properties;
a page template; and
form definitions,
wherein the page properties, page template, and form definitions are determined from the workflow configuration rules, the routing configuration rules, and a target platform configuration.

11. The workflow-based application generator of claim 8, wherein to generate the workflow-based application, the data processing device is further to:
select a target platform configuration;
generate the workflow-based application using the workflow context and the selected target platform configuration; and
build a deployment package using the generated workflow-based application.

12. The workflow-based application generator of claim 8, further comprising the workflow page repository to store workflow pages, each workflow page representing steps in a workflow and comprises a reusable component defined by metadata, each workflow page including an ID.

13. The workflow-based application generator of claim 8, wherein the received workflow input files includes a file having a format type that includes Business Process Execution Language (BPEL), Java-based BPM/Workflow Management System (YAWL), and XML Process Definition Language (XPDL).

14. A non-transitory machine-readable medium comprising instructions that when executed by a data processing device, cause the data processing device to:
receive workflow input files comprising workflow files and business process definition file;
create a workflow page repository storing workflow pages and metadata for each workflow page including a workflow page description describing one or more steps performed by each workflow page, wherein each workflow page includes reusable code that performs the one or more steps of the workflow page;
parse the workflow input files to determine a plurality of feature functionalities of a workflow-based application being generated, and to determine one or more processing steps for each feature functionality;
create workflow configuration rules including the plurality of feature functionalities of the workflow-based application being generated, and including the one or more processing steps for each feature functionality, wherein creating the workflow configuration rules further includes defining and editing, by input received via a user interface, at least one of the workflow configuration rules;

create routing configuration rules including an order for executing the feature functionalities and dependencies for the feature functionalities;

for each feature functionality in the workflow configuration rules, search the workflow page descriptions in the workflow page repository based on the steps for the feature functionality in the workflow configuration rules;

identify matching workflow pages from the searching of the workflow page repository for each feature functionality;

build workflow pages for any of the feature functionalities that do not have a matching workflow page, and storing the built workflow pages in the workflow page repository;

include workflow page identifiers for the matching workflow pages and the built workflow pages in the workflow configuration rules;

include an order of executing the matching and built workflow pages and input and output requirements of each of the matching and built workflow pages in the routing configuration rules;

generate a workflow context according to the workflow configuration rules, the routing configuration rules, and the matching, built workflow pages, wherein generating the workflow context includes:

retrieve a workflow page template; and aggregate the workflow configuration rules, the routing workflow rules, the matching, built workflow pages, and the retrieved workflow page template into the generated workflow context; and generate the workflow-based application based upon the workflow context.

15. The non-transitory machine-readable medium of claim 14, wherein to generate the workflow-based application, said instructions are further to cause the data processing device to:

select a target platform configuration;

generate the workflow-based application using the workflow context and the selected target platform configuration; and build a deployment package using the generated workflow-based application.

16. The non-transitory machine-readable medium of claim 14, wherein the generated workflow-based application includes a plurality of workflow pages, each workflow page in the generated workflow-based application including:

page properties;

a page template; and form definitions, wherein the page properties, page template, and form definitions are determined from the workflow configuration rules, the routing configuration rules, and a target platform configuration.

17. The non-transitory machine-readable medium of claim 14, wherein the received workflow input files includes a file having a format type that includes Business Process Execution Language (BPEL), Java-based BPM/Workflow Management System (YAWL), and XML Process Definition Language (XPDL).

* * * * *